(No Model.) 2 Sheets—Sheet 1.
R. P. SCOTT.
CAN FILLING MACHINE.
No. 585,233. Patented June 29, 1897.
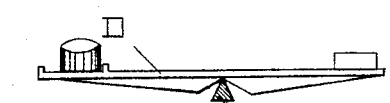
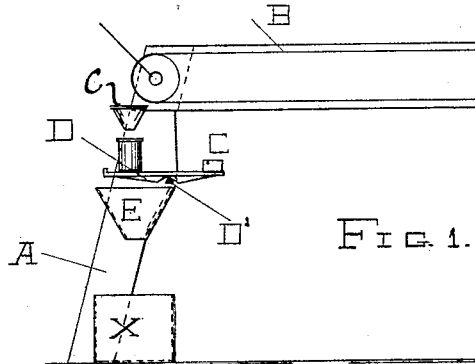
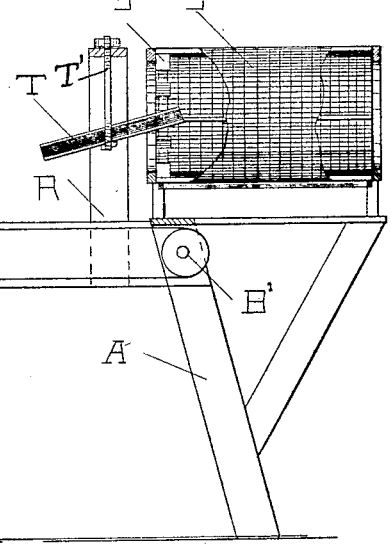
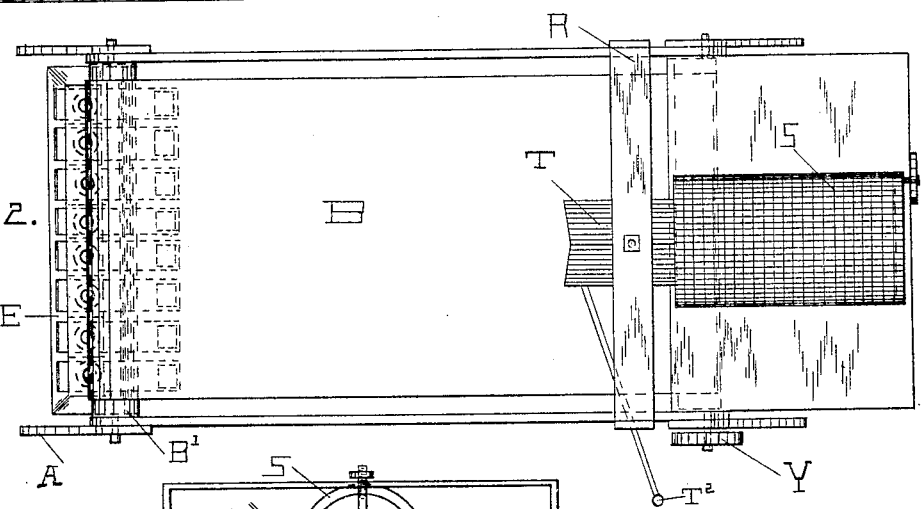
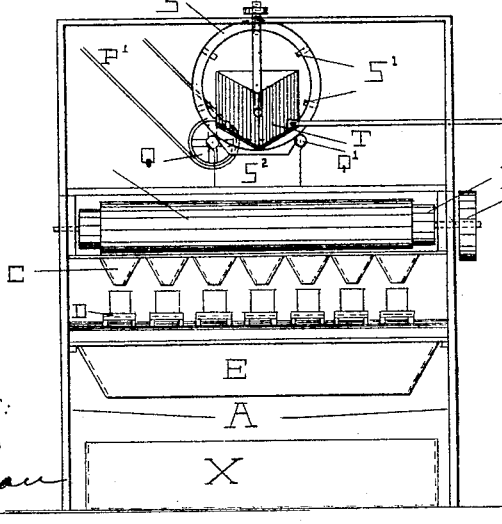
WITNESSES:
N. Cottingham
INVENTOR,
Robert P. Scott (No Model.) 2 Sheets—Sheet 2.
R. P. SCOTT.
CAN FILLING MACHINE.
No. 585,233. Patented June 29, 1897.
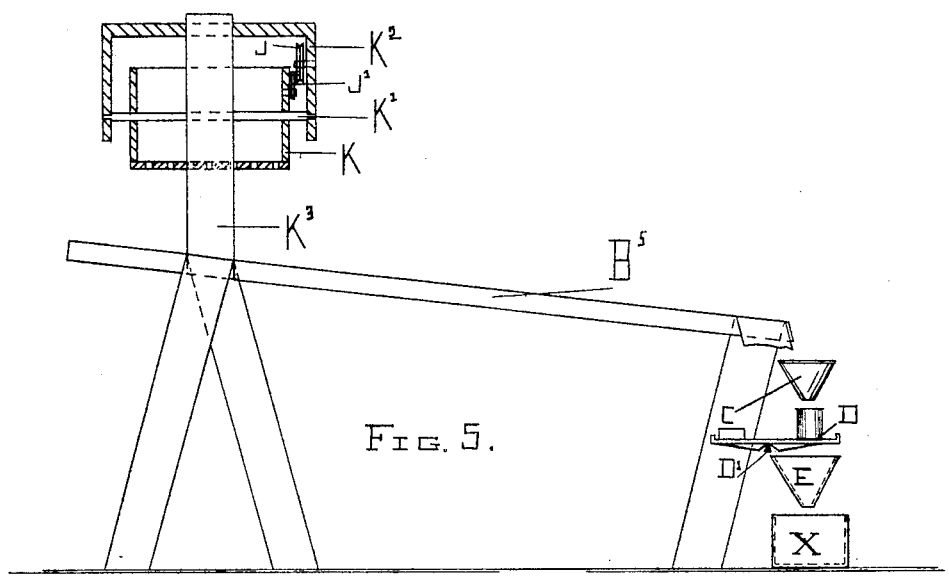
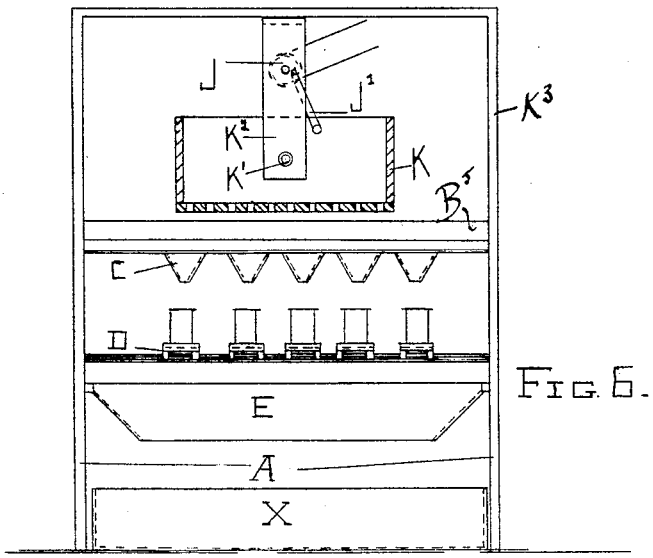
WITNESSES:
INVENTOR,
Robert P. Scott

United States Patent Office.

ROBERT P. SCOTT, OF CADIZ, OHIO.

CAN-FILLING MACHINE.

SPECIFICATION forming part of Letters Patent No. 585,233, dated June 29, 1897.

Application filed March 18, 1895. Serial No. 542,289. (No model.)

*To all whom it may concern:*

Be it known that I, ROBERT P. SCOTT, a citizen of the United States, residing at Cadiz, Harrison county, Ohio, have invented a new and useful Machine for Filling Green Peas into Cans, of which the following is a specification, reference being had to the accompanying drawings, in which—

Figure 1 is a side elevation of the preferred type of my machine; Fig. 2, a plan; Fig. 3, an end elevation, and Fig. 4 a detail thereof. Fig. 5 is a side elevation of a modified form of my machine, and Fig. 6 an end view of the same.

The object of my invention is to produce a machine which is especially adapted for filling green peas into cans, the quantity of peas in each can being automatically determined. The types of machines heretofore used for this purpose have conducted the peas from hoppers into measuring-receptacles or into funnels for guiding them into the can-mouths, in which funnels or receptacles the peas have become massed together. At the bottom of the funnels or receptacles cut-off devices have been arranged which were opened when it was designed to permit the peas to fall into the cans. Now it is a peculiar quality of green peas that when they are thus massed together in a narrow receptacle they form an arch which prevents them from falling out at the bottom of the receptacle when the bottom is removed. In fact a cup full of green peas in the damp condition in which they are found prior to filling them into cans can often be inverted without having the peas drop out. Inventors of these old types of machines have recognized this difficulty and have used shaking or knocking devices acting against the funnels or receptacles to overcome it. This has made the machines complicated and has not as yet solved the difficulty in a commercially practical way.

In my machine the difficulty is overcome by filling the peas on a different principle—that is to say, I do not allow the peas to come together in funnels or receptacles in any great quantity, nor do I detain them in the funnels until a predetermined quantity has accumulated and then permit them to drop out by removing the bottom of the funnel. On the contrary I feed the peas in quantities small for each can, permitting them to drop completely through the funnels as soon as they reach them and automatically regulate the amount in each can by weight, which is the mode not only preferred but practically demanded by the packers. Again, I secure the utmost degree of simplicity in construction, the machine, broadly speaking, consisting of a feeding spreader, shown in the machine of Fig. 1 as the discharge-trough of a cleaning-cylinder, by which the peas are partially spread out and fed gradually, a conductor shown in the same machine as an endless apron by which the peas are kept in their spread condition and perhaps further spread, a series of funnels at the far end of the conductor, and a series of can-seats under the funnels.

In the machine of Fig. 1 the standard A has mounted thereon an endless apron B, running over drums B' at its opposite ends. This apron serves both to keep the peas scattered in their journey and as an inspecting-apron, the operators standing at the sides being enabled to pick out the defective peas. At the end of the apron are mounted a number of funnels or chutes C, which, as seen, are directly below the edge of the same. Immediately below these funnels C are mounted the scale-beams D on pivots D', with a can-seat at one end and a platform for a weight at the opposite end. Situated immediately below these scale-beams D is the trough E, which acts both to catch the cans when filled and the scale-beam tips over, and also to receive the peas, which at that time will come through the funnel C and have no can in place to go into.

When the scale-beams D tip over, their left-hand end, as seen in Fig. 1, strikes the side of the trough E about two inches below its top edge, so that the cans may slip down on the scale-beams and be held from further displacement by the upper two inches of the trough. A box X catches the peas as they fall from the trough E.

In practice I sometimes pass the peas through a cleaning-cylinder S, mounted on a frame $S^2$ and driven by a pulley Q, which turns one of the travelers Q', on which the cylinder rests. This cylinder is provided at one end with buckets S', which raise up the peas and discharge them upon a spout T, which is mounted on a pivot T', hanging from a trestle R. A motion back and forth is given to this spout by means of a link T², which might obviously be automatically actuated.

In the machine shown in Figs. 5 and 6 of the drawings the funnels, can-seats, and trough remain the same. Instead of an endless apron, however, I provide an inclined board B⁵, which acts as a conductor for keeping the peas spread and leading then to the funnels. Instead of the spout T of the machine first described I employ an oscillating box K, having perforations in its bottom, which box is mounted upon an axis K', having a bearing in a frame K², mounted upon a frame K³. This box is oscillated from side to side by means of a pulley J and pitman J', attached to one side of the box. The peas being dumped into the box K fall through its perforated bottom and are scattered upon the conveyer, whence they roll in a spread condition into the funnels.

It will be noticed that in each machine I dispense with all plungers, valves, cut-offs, and the shaking devices necessitated thereby and never allow the peas to crowd together in any confined receptacle, the funnels being bottomless and allowing the peas one after another as they arrive to fall through into the cans.

What I claim is—

1. A green-pea can-filling machine comprising the combination of a feeding spreader, by which the peas are partially or entirely spread out and fed in quantities small for each can, a conductor on which the peas are maintained in their spread condition or further spread and lead to the cans, a series of open-bottom funnels at the end of the conductor and a series of can-seats under the funnels, substantially as described.

2. A can-filling machine for green peas comprising the combination of an endless apron, a series of funnels immediately under one edge of the apron and a series of scale-beams carrying can-seats at one side under the funnels, substantially as described.

3. A can-filling machine for green peas comprising the combination of an endless apron, a series of funnels immediately under one edge of the apron, a series of scale-beams carrying can-seats under the funnels and a trough under the scale-beams arranged to catch the cans from falling when tilted and to catch the surplus peas, substantially as described.

4. A can-filling machine for green peas comprising the combination of a cleaning-cylinder, a trough for leading the peas therefrom, an endless apron under the trough, a series of funnels under the opposite edge of the apron and a series of scale-beams under the funnels, substantially as described.

5. A machine for filling green peas into cans comprising the combination of an endless apron, a series of funnels at one end thereof and a series of scale-beams carrying can-seats thereunder arranged side by side and pivoted on an axis transverse to the machine substantially as described.

ROBERT P. SCOTT.

Witnesses:
THOS. M. DOBBIN,
WILLIAM H. BERRY.